United States Patent [19]

Dreher et al.

[11] 3,948,782
[45] Apr. 6, 1976

[54] DRILLING WITH LOW VISCOSITY FLUIDS

[75] Inventors: Karl D. Dreher; William B. Gogarty, both of Littleton, Colo.

[73] Assignee: Marathon Oil Company, Findlay, Ohio

[22] Filed: Sept. 10, 1973

[21] Appl. No.: 395,672

Related U.S. Application Data

[63] Continuation-in-part of Ser. No. 375,293, June 29, 1973, abandoned.

[52] U.S. Cl. .............. 252/8.5 P; 175/65; 252/8.5 C
[51] Int. Cl.² .......................................... C09K 7/02
[58] Field of Search .......... 252/8.5 A, 8.5 C, 8.5 M, 252/8.5 P, 8.55 D; 166/274, 275; 175/65

[56] References Cited
UNITED STATES PATENTS

| | | | |
|---|---|---|---|
| 3,275,075 | 9/1966 | Gogarty et al. ..................... | 166/274 |
| 3,472,769 | 10/1969 | Lummus et al. ..................... | 252/8.5 |
| 3,734,856 | 5/1973 | Son ..................................... | 252/8.5 |
| 3,752,763 | 8/1973 | Kablaoui et al. ..................... | 252/8.5 |
| 3,822,746 | 7/1974 | Gogarty ........................... | 166/275 X |

FOREIGN PATENTS OR APPLICATIONS

| | | |
|---|---|---|
| 921,690 | 2/1973 | Canada |

*Primary Examiner*—Herbert B. Guynn
*Attorney, Agent, or Firm*—Joseph C. Herring; Jack L. Hummel

[57] ABSTRACT

An improved method of drilling a well is effected by circulating in the well a drilling fluid containing lamellar micelles at flow rates predetermined to produce retro-viscous behavior in the drilling fluid at noncryogenic temperatures. The composition contains 4–15% surfactant (preferably petroleum sulfonate having an average equivalent weight of 350–525), 30–70% liquid hydrocarbon, 15–66% water and optionally up to 20% cosurfactant (preferably an alcohol containing 1–20 carbon atoms) and/or electrolyte (preferably inorganic salt) and the micelles have an axial ratio of at least 3.5. Preferably, the composition has a viscosity of at least 75 cp at a shear rate of $10^{-1}$ seconds at 23°C. The composition is substantially optically clear, phase stable, birefrigent, and the flow properties are such that substantially large increases in flow rates, e.g., 20-fold, can be realized at very small pressure increases, e.g., 5%. Additional additives to impart desired drilling properties can be included with the composition.

13 Claims, 3 Drawing Figures

Fig. 1 SHEAR RATE vs. SHEAR STRESS

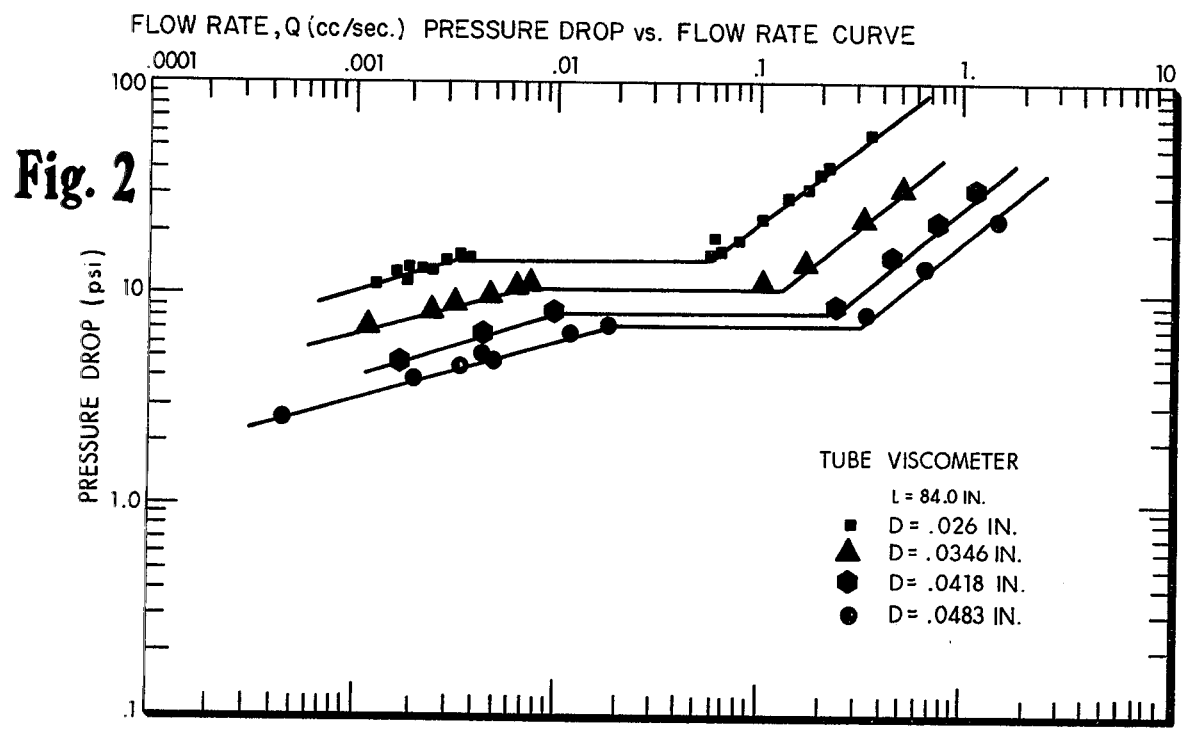
Fig. 2
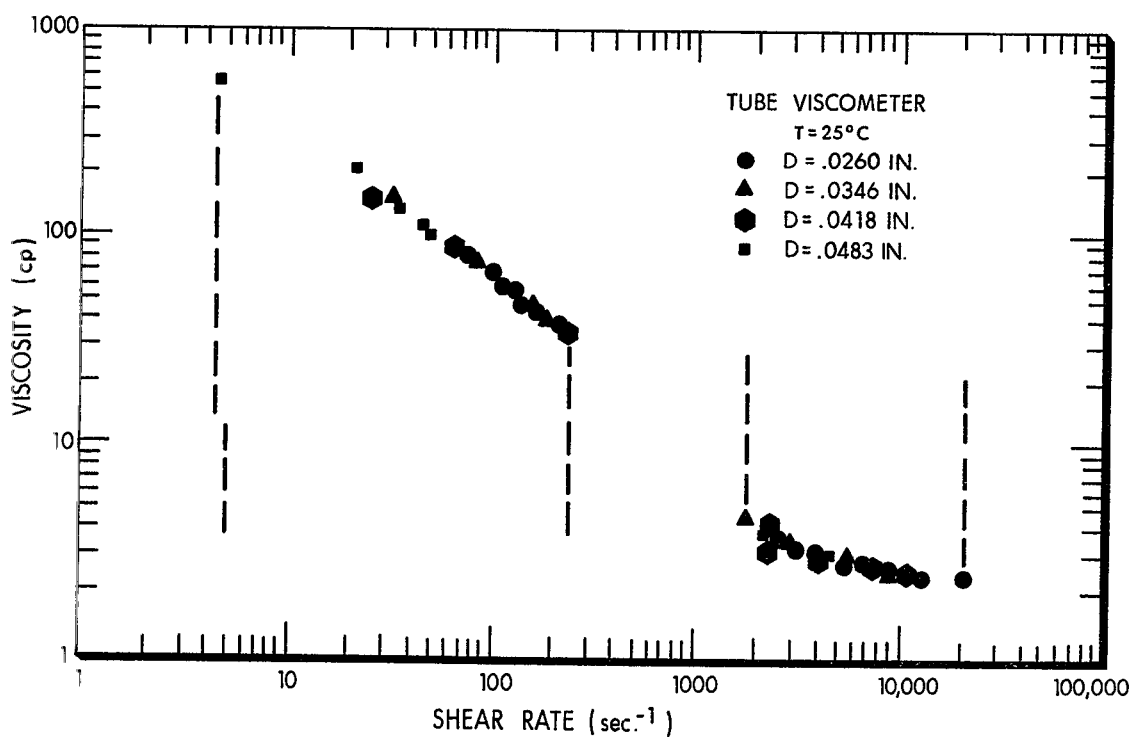
Fig. 3 APPARENT VISCOSITY vs. SHEAR RATE CURVE

DRILLING WITH LOW VISCOSITY FLUIDS

CROSS-REFERENCE TO RELATED APPLICATIONS

This is a continuation-in-part of Ser. No. 375,293, filed June 29, 1973, now abandoned.

BACKGROUND OF THE INVENTION

1. Field of the Invention.

This invention relates to an improved drilling process wherein the drilling fluid contains water, surfactant, hydrocarbon, and optionally cosurfactant and/or electrolyte. Lamellar micelles are present in the composition.

2. Description of the Prior Art.

Zlochower and Schulman, in the *Journal of Colloid and Interface Science*, Vol. 24, No. 1, May, 1967 pp. 115–124 defines a liquid crystal obtained from a composition consisting of amino methyl propanol and amino butanol oleate microemulsions of water and benzene. The initial solution, i.e., before the liquid crystal, is an isotropic solution consisting of spherical micelles of decyl trimethylammonium bromides--chloroform in water. This is titrated with chloroform to form the liquid crystal and upon further addition of the chloroform, a second isotropic solution is formed with the chloroform as the external phase.

Canadian Pat. No. 921,690 teaches an oil recovery process using a micellar system containing 2–16% surfactant, 3–20% hydrocarbon, 1–5% alcohol and the residue water which exhibits birefringence, shear thickening behavior at low shear rates and shear thinning behavior at high shear rates, etc. These systems do not exhibit retro-viscous properties as do applicants' compositions.

Both oil-external and water-external micellar dispersions (this term includes microemulsions, micellar solutions, etc.) are described in the art, e.g., see U.S. Pat. Nos. 3,254,714 to Gogarty et al.; 3,497,006 to Jones et al.; 3,506,070 and 3,507,071 to Jones. The dispersions contain petroleum sulfonates (average equivalent weight = 350–525), hydrocarbon, water, cosurfactant (can be alcohol, etc.) and/or electrolyte. These dispersions generally exhibit a decrease in viscosity upon increase in flow rate.

U.S. Pat. No. 3,734,856 to Son, Jr. teaches using a micellar dispersion as a drilling fluid. The dispersion contains 10–95% hydrocarbon, 5–40% petroleum sulfonate having an average equivalent weight of 350–520, and sufficient water to obtain a desired viscosity. Electrolytes and/or cosurfactants can be incorporated into the dispersion.

SUMMARY OF THE INVENTION

An improved process of drilling a well is accomplished by using as a drilling fluid a composition which exhibits a very large increase in flow rate under a very small pressure increase. These compositions contain micelles having an axial ratio of at least 3.5 and contain 4–15% surfactant, 30–70% liquid hydrocarbon, 15–66% water, and optionally up to 20% cosurfactant and/or up to 5% by weight, based on the water, of an electrolyte, e.g., inorganic salt. Additives such as bentonite, weighting agents, lost circulation agents, fluid loss control agents, oxygen inhibitors, oxygen scavenging agents, etc., may be incorporated within the composition.

DESCRIPTION OF THE DRAWINGS

FIG. 2 shows the relation of pressure drop to flow rates in different size tubes. The tubes are made of stainless steel, are 84 inches long and have diameters as indicated in FIG. 1. Data for this figure are obtained by titrating with distilled water an anhydrous composition containing 9.8% ammonium heptadecylbenzene sulfonate, 18.5% cyclohexanol, and 71.8% n-decane, the percents based on weight. On initial titration it is postulated that spherical micelles are obtained. Further titration results in lamellar micelles, at which time the pressure drop vs. flow rate exhibits a flat response. It is postulated that additional titration obtains substantially spherical micelles. The compositions containing the substantially spherical micelles act as Newtonian fluids.

FIG. 3 represents the relationship of viscosity vs. shear rate in the tubes identified in FIG. 2, these data obtained at 25°C. The discontinuity of the graph in this Figure is characteristic of the retro-viscous compositions of this invention.

DESCRIPTION OF PREFERRED EMBODIMENTS OF INVENTION

Figure 1:
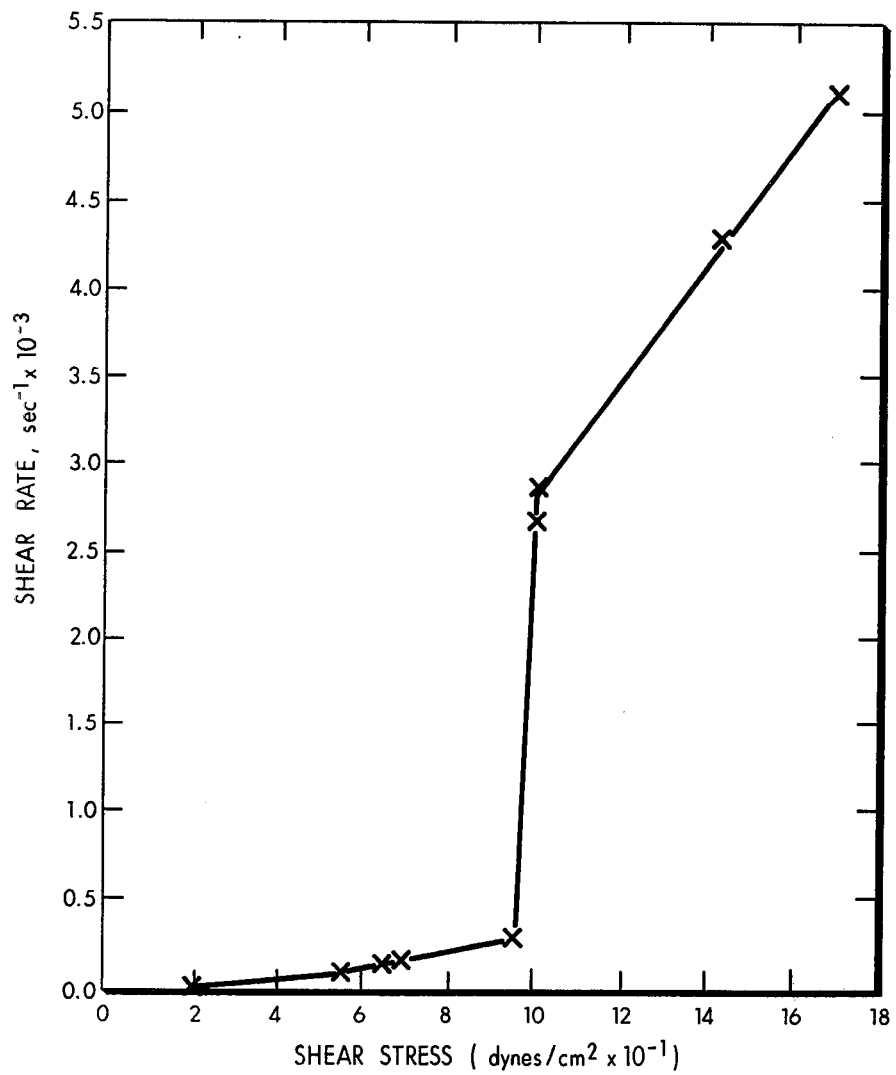
In FIG. 1, the shear rate is plotted vs. the shear stress from Example 2 data. Up to a shear stress of about 95 dynes/cm$^2$ and after a shear stress of about 100 dynes/cm$^2$, the particular composition of this invention acts as a pseudo plastic fluid. Between these shear stresses is the unique retro-viscous property of the invention, i.e., the composition appears to have no resistance to flow at these shear stresses but at lower and higher shear stresses the composition appears viscous.

The compositions of this invention contain lamellar micelles which have an axial ratio (ratio of length divided by diameter) of at least 3.5, preferably at least 10 and more preferably at least about 20. They are optically clear, phase stable, exhibit birefringence, and preferably have a viscosity of at least 75 cp at a shear rate of 10 sec$^{-1}$ at 23°C. When under flowing conditions and at particular pressures, an increase in pressure, e.g., up to 5%, will effect a substantially large increase in flow rate, e.g., 20-fold increase. These compositions are like liquid crystals in that they exhibit birefringence. Also, the compositions have an elastic component which increases with shear rate, i.e., the faster you shear the composition, the more energy is stored in the composition.

The compositions contain water, surfactant, hydrocarbon, and optionally cosurfactant and/or electrolyte.

The surfactant is present in concentrations of about 4 to about 15%, preferably about 5.5 to about 12% and more preferably about 7 to about 9%. Carboxylates and sulfonates are useful as the surfactant. Preferably the surfactant is a sulfonate, more preferably an alkaryl sulfonate (includes petroleum sulfonates) and has an average equivalent weight within the range of about 350 to about 525, preferably about 375 to about 500 and more preferably about 400 to about 470. Mono and/or polysulfonates are useful. Examples of such sulfonates include alkaryl sulfonate wherein the alkyl group contains about 6 to about 20 carbon atoms and preferably about 10 to about 17 carbon atoms, e.g., ammonium heptadecylbenzene sulfonate. Cation of the sulfonate is an alkali metal or ammonium. The sulfonate can be petroleum sulfonate, e.g., commercially available as Shell sodium sulfonate, a petroleum sulfonate having an average equivalent weight of about 470, an activity of 62% and is available from the Industrial Chemical Division of Shell Chemical Company, Houston, Tex. Sonneborn Chemical and Refining Company, 300 Park Ave. So., New York, N.Y., markets sodium petroleum sulfonates useful with the invention:

1. Petronate L, average equivalent weight 415–430,
2. Petronate K, average equivalent weight 420–450,
3. Petronate HL, average equivalent weight 440–470,
4. Petronate CR, average equivalent weight 490–510,
5. Pyronate 50, average equivalent weight 360.

The Sonneborn sulfonates are about 62% active sulfonate, the residue includes 33% mineral oil, about 4.5% water, and the balance salts. Bryton Chemical Company, 630 Fifth Ave., New York 20, N.Y. has a series of petroleum sulfonates that are useful:

1. Bryton F, sodium petroleum sulfonate having an average equivalent weight of 465,
2. Bryton T, sodium petroleum sulfonate having an average equivalent weight of 500,
3. Bryton ammonium sulfonate 35-K, an ammonium sulfonate having an average equivalent weight of 465.

The sulfonates within the above equivalent weight range exhibit both oil- and water-solubility properties.

Useful carboxylates are preferably the monovalent cation and ammonium salts of fatty acids; they preferably have average equivalent weights within the range of about 200 to about 500 and preferably about 250 to about 400 and more preferably about 300 to about 375. Specific examples include the salts of the following acids: aliphatic acids such as cupric, lauric, myristic, palmitic and stearic; aromatic acids such as substituted benzoic, naphthoic, substituted naphthoic and similar aromatic acids; and in general saturated fatty acids and substituted products thereof and unsaturated fatty acids and substituted products thereof. Average equivalent weight is defined as the average molecular weight divided by the average number of caboxylate or sulfonate groupings per molecule. Thus, the equivalent weight of a sulfonate is equal to the molecular weight when the sulfonate is a mono sulfonate.

The hydrogen is present in concentrations of about 30 to about 70%, preferably about 40 to about 60 and more preferably about 45 to about 55%. The hydrocarbon can be crude oil (both sweet and sour crudes), partially refined fractions of a crude oil such as gasoline, kerosene, naphtha, liquefied petroleum gases, and other distillation cuts from fractionation of crude oil. Refined fractions of crude oil are also useful, such as jet fuel, "finished gasoline," benzene, toluene, xylene, propylene, butylene, etc. Also, the hydrocarbon can be a synthesized hydrocarbon including substituted paraffinic and aromatic hydrocarbons as well as halogenated hydrocarbons. Unsulfonated hydrocarbon within the petroleum sulfonates is also useful.

The water can be soft water, brackish water, or a brine. Concentration of the water is about 15 to about 66%, preferably about 20 to about 55% and more preferably about 25 to about 50%. If ions are present in the water, they are preferably compatible with the surfactant as well as other components within the composition.

The cosurfactant can be an alcohol, ester, aldehyde, ketone, ether, or a compound containing one or more of hydroxy, oxy, epoxy, amino, chloro, bromo or like groups. The cosurfactant contains 1 to about 20 or more and preferably about 3 to about 16 carbon atoms. Examples include isopropanol, n- and i- butanols, amyl alcohols, such as n-amyl alcohol, 1- and 2-hexanol, cyclohexanol, 1-octanol, decyl alcohols, alkaryl alcohols such as p-nonyl phenol, glycol monobutyl ether (butyl Cellusolve), diethylene glycol monobutyl ether (butyl Carbitol), ethoxylated alcohols and alcoholic liquors such as fusel oil. The preferred cosurfactant is an aliphatic alcohol(s) including primary, secondary and/or tertiary alcohols. The cosurfactant is present in concentrations of up to about 20% and preferably about 0.001 to about 17% and more preferably about 0.1 to about 15%.

The electrolyte is present in concentrations up to about 5% and preferably about 0.001 to about 3% and more preferably about 0.01 to about 2.5%, based on the water. The electrolyte is an inorganic salt, inorganic base, inorganic acid or combination thereof. Specific examples include sodium hydroxide, sodium chloride, sodium sulfate, sodium nitrate, hydrochloric acid, sulfuric acid, ammonium chloride, ammonium hydroxide, ammonium sulfate, potassium chloride, etc. Other examples of electrolytes are taught in U.S. Pat. No. 3,330,343 to Tosch et al.

The addition of the electrolyte generally broadens the retro-viscous range of the composition. Retro-viscous, as used herein, is defined as the property of the composition to exhibit essentially negligible pressure drop at increased flow rates. This means that the mixture can exhibit extremely low viscosity over a certain range of shear rates. That is, essentially no increase in pressure drop is required to increase the flow rate of the composition—see FIG. 2. Broadening out the retro-viscous range may be desired where the composition comes in contact with fluids which adversely influence this property, e.g., particular formation fluids in subterranean reservoirs. That is, by starting with a broad retro-viscous range, the composition will be compatible over a wider range of environmental conditions before it degrades to a microemulsion.

The compositions of this invention are made up of lamellar micelles which can be viewed as alternating layers of water and hydrocarbon with surfactant between these layers with the polar groups of the surfactant in the water. If the composition is obtained by titrating an oil-external micro-emulsion, it is postulated that the microemulsion has substantially spherical micelles and acts like a Newtonian fluid but upon further titration with water, the lamellar-type micelle is obtained. Axial ratio of the micelle is critical, i.e., it must be within the range defined earlier.

The drilling fluid can be monitored during the process, preferably at the surface, to determine whether the composition needs to be adjusted to maintain the retro-viscous properties. For example, additional components may necessarily be added to obtain these properties or a portion of a component(s) may be extracted to maintain the property.

Other additives can be incorporated into the retro-viscous composition. These additives are those generally known to the art and can generally be qualified as those which do not substantially exert an adverse influence upon the retro-viscous properties of the composition. A small amount of experimentation may be necessary to determine preferred concentrations, etc., and preferred additives which will work best. Examples of additives useful with the composition include corrosion inhibitors, oxidation inhibitors, oxygen scavenging agents, bactericides, viscosity-increasing agents (either hydrophilic or oleophilic), clays such as bentonite, additives to obtain higher gel strength, weighting agents, loss circulation agents, etc.

These compositions can be used with all types of drilling rigs. Conventional methods known in the drilling art are useful with these compositions; however, periodic checks of the composition are recommended to insure that the retro-viscous properties are maintained.

Flow rates of the drill fluid should be maintained to insure the retro-viscous behavior of the fluid. These rates can be determined by those skilled in the art after reading the specification and studying the examples.

The following examples are representative of the compositions. Unless otherwise specified, all percents are based on weight.

EXAMPLE 1

To illustrate the criticality of the viscosity, the water concentration, etc., the following eight samples are presented. These samples are composed of identical components and are admixed under identical conditions:

TABLE I

| | SAMPLE NUMBERS (% BY WEIGHT) | | | | | | | |
|---|---|---|---|---|---|---|---|---|
| | 1 | 2 | 3 | 4 | 5 | 6 | 7 | 8 |
| $NH_4$-heptadecyl-benzene sulfonate | 9.0 | 7.7 | 7.4 | 7.3 | 7.2 | 7.15 | 6.1 | 7.18 |
| Cyclohexanol | 16.9 | 14.5 | 14.0 | 13.9 | 13.6 | 13.5 | 11.5 | 13.56 |
| n-Decane | 65.7 | 56.4 | 54.2 | 53.8 | 52.9 | 52.4 | 44.7 | 52.5 |
| Distilled Water | 8.3 | 21.4 | 24.3 | 25.0 | 26.2 | 27.0 | 37.6 | 26.7 |
| Viscosity (cp) at shear rate of 10 sec$^{-1}$ and 23°C. | 3.6 | 5.7 | 6.3 | 82.0 | 118.0 | 350.0 | 50.0 | 200.0 |

Of the above eight samples, only samples 4, 5, 6, and 8 are compositions of this invention. The viscosities of samples 1, 2, 3, and 7 are too low even though sample 7 has a viscosity of 50 cps. The water concentration of Sample 1 is also too low, i.e., 8.3%—the minimum water concentration of the invention composition is 15%. Samples 4, 5, 6, and 8 exhibit retro-viscous properties, i.e. essentially zero viscosity over particular shear rates; whereas samples 1, 2, 3, and 7 do not.

EXAMPLE 2

Sample 6 from Example 1 is studied. Pressure drop vs. flow rate is studied in a stainless steel tube having a diameter of 0.2646 inch and a length of 132.38 inches.

TABLE II

| TUBE VISCOMETER | |
|---|---|
| ΔP (psi) | Q (cc/sec) |
| 13.45 | 0.0010 |
| 14.12 | 0.0011 |
| 16.60 | 0.0016 |
| 16.74 | 0.0016 |
| 16.74 | 0.0018 |
| 18.15 | 0.0391 |
| 23.20 | 0.0551 |
| 29.54 | 0.0806 |
| 32.46 | 0.0909 |
| 42.0 | 0.140 |
| 59.0 | 0.201 |
| 80.0 | 0.310 |
| 97.0 | 0.373 |

From the above data, it is evident that for a flow rate increase of between 0.0016 to 0.0391 cc/sec, the pressure drop across these flow rates is essentially constant. This means that a very small increase in pressure is required to increase the flow of the mixture by more than 10-fold. Within this flow rate range, the viscosity is essentially that of gas.

EXAMPLE 3

Additional samples of compositions obtained with sodium petroleum sulfonate are taught in Table III:

TABLE III

| | 9 | 10 | 11 |
|---|---|---|---|
| | % | % | % |
| Shell sulfonate | 12 | 12 | 17.3 |
| n-Decane | 50 | 50 | 37.1 |
| Distilled Water | 38 | 38 | 44.5 |
| Isopropanol | — | — | 1.1 |

The Shell sulfonate has an average equivalent weight of about 470 and is a monosulfonate. Activity of the Shell sulfonate in Samples 10 and 11 is 62%, e.g., sample 10 contains 7.44% active sulfonate, the residue is salts and unreacted hydrocarbon, and the activity in Sample 9 is 100%.

EXAMPLE 4

These data are obtained as a function of titrating a stock solution of $NH_4$-heptadecylbenzene-p-sulfonate cyclohexanol and n-decane with distilled water. These data suggest that as the water is added, an inversion from an oil-external system to a water-external system occurs. Although all eight samples are optically clear, only samples 14, 15, 16 and 17 exhibit birefringence as evidenced by the depolarization of incident light (these data are obtained with a Brice-Phoenix light scattering photometer) and samples 12, 13 and 18 show no birefringence. The viscosity data and depolarization measurements suggest that as water is added to the system, small spherical water droplets suspended in decane (note the specific conductivity of sample 1) change to lamellar structures. Such a change can be considered as alternating layers of water and decane with the sulfonate and cyclohexanol oriented between these layers with their polar groups in the aqueous phase. The data for sample 18 suggests complete inversion to small oil droplets suspended in water. Data for these eight samples are illustrated in Table IV.

TABLE IV

| | FLUID PROPERTIES | | |
|---|---|---|---|
| Sample Number | Specific Conductivity (mhos/cm) | Viscosity (cp) | Depolarization (IH/Iv) |
| 12 | $4 \times 10^{-6}$ | 4 | 0 |
| 13 | $1 \times 10^{-3}$ | 8 | 0 |
| 14 | $1.6 \times 10^{-3}$ | 9 | 1.0 |
| 15 | $1.7 \times 10^{-3}$ | 98 | 1.0 |
| 16 | $1.7 \times 10^{-3}$ | 450 | 1.0 |

TABLE IV-continued

FLUID PROPERTIES

| Sample Number | Specific Conductivity (mhos/cm) | Viscosity (cp) | Depolarization (IH/Iv) |
|---|---|---|---|
| 17 | $1.7 \times 10^{-3}$ | 1000 | 1.0 |
| 18 | $1.7 \times 10^{-3}$ | 250 | 1.0 |
| 19 | $3.6 \times 10^{-3}$ | 62 | 0 |

Under specific conductivity, mhos is defined as 1/ohms and cm is centimeter. The viscosity is obtained on a Brookfield viscometer run at 6 rpm at 23°C. IH and IV are defined as intensity of the horizontal component of scattered light from the fluid and intensity of the vertical component of the same light, respectively.

Fluid samples 12 and 13 are oil-external microemulsions whereas sample 7 is a water-external microemulsion and samples 14, 15, 16, and 17 are in the transition stage between an oil-external microemulsion and a water-external microemulsion and are representative of compositions of this invention.

Pressure drop (PSI) vs. flow rate (cc/sec) in a tube viscometer having dimensions as indicated in the tables for samples 15–19 are plotted in Tables V, VI, VII, VIII and IX ($T_w$ = shear stress at the wall of the tube, $\Delta v/\Delta r$ = shear rate and $\mu a$ = apparent viscosity):

TABLE VI

FLUID 12
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 1.60 | .00635 | 8.48 | 235 | 3.6 |
| 1.64 | .00599 | 8.72 | 222 | 3.9 |
| 8.10 | .0437 | 43.0 | 1623 | 2.6 |
| 8.13 | .0461 | 43.2 | 1712 | 2.5 |
| 19.16 | .1206 | 101.9 | 4477 | 2.3 |
| 19.06 | .1246 | 101.4 | 4628 | 2.2 |
| 19.06 | .1218 | 101.4 | 4313 | 2.4 |
| 29.4 | .1935 | 156.4 | 6852 | 2.3 |
| 52.5 | .338 | 279.3 | 11966 | 2.3 |
| 52.0 | .330 | 276.6 | 11685 | 2.4 |
| 52.0 | .332 | 276.6 | 11753 | 2.4 |
| 71.3 | .458 | 379.3 | 16214 | 2.3 |
| 71.3 | .454 | 379.3 | 16075 | 2.4 |
| 140.0 | .859 | 744.7 | 30415 | 2.4 |
| 140.0 | .903 | 744.7 | 31973 | 2.3 |

TABLE VI

FLUID 13
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 5.4 | .0215 | 28.7 | 696 | 4.1 |
| 7.1 | .0295 | 37.7 | 954 | 3.9 |
| 7.0 | .0301 | 37.3 | 973 | 3.8 |
| 9.2 | .0400 | 48.9 | 1294 | 3.8 |
| 14.2 | .0648 | 75.5 | 2096 | 3.6 |
| 13.5 | .0631 | 71.8 | 2041 | 3.5 |
| 13.5 | .0610 | 71.8 | 1973 | 3.6 |
| 19.6 | .0960 | 104.2 | 3106 | 3.3 |
| 19.3 | .0980 | 102.7 | 3170 | 3.2 |
| 19.3 | .1024 | 102.7 | 3312 | 3.1 |
| 29.5 | .1576 | 156.9 | 5097 | 3.1 |
| 29.5 | .1577 | 156.9 | 5100 | 3.1 |
| 43.0 | .2488 | 228.7 | 8049 | 2.8 |
| 42.5 | .2521 | 226.1 | 8156 | 2.8 |
| 59.0 | .3448 | 313.8 | 11152 | 2.8 |
| 58.8 | .3450 | 312.8 | 11159 | 2.8 |
| 100.0 | .668 | 531.9 | 21609 | 2.5 |
| 100.0 | .662 | 531.9 | 21415 | 2.5 |
| 100.0 | .671 | 531.9 | 21708 | 2.45 |

TABLE VII

FLUID 16
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 3.9 | .000299 | 20.8 | 13.3 | 156 |
| 10.5 | .00195 | 56.0 | 86.6 | 64.7 |
| 12.2 | .00285 | 65.1 | 126.8 | 51.3 |
| 12.8 | .00288 | 68.3 | 128.4 | 53.2 |
| 12.8 | .00299 | 68.3 | 132.9 | 51.4 |
| 18.0 | .00670 | 96.0 | 298.0 | 32.2 |
| 18.8 | .0700 | 100.3 | 2663 | 3.8 |
| 19.1 | .0750 | 101.9 | 2853 | 3.6 |
| 26.8 | .113 | 143.0 | 4299 | 3.3 |
| 31.9 | .135 | 170.2 | 5133 | 3.3 |
| 41.0 | .195 | 218.8 | 7418 | 2.9 |
| 73.0 | .410 | 389.5 | 15598 | 2.5 |

TABLE VIII

FLUID 15
TUBE VISCOMETER - L = 336.24 cm, D = 0.0672 cm

| $\Delta P$ psi | Q cc/sec | $T_w$ dynes/cm$^2$ | $\Delta v/\Delta r$ sec$^{-1}$ | $\mu^a$ cp |
|---|---|---|---|---|
| 13.45 | .00103 | 46.33 | 53.8 | 86.1 |
| 14.12 | .00105 | 48.61 | 54.9 | 88.5 |
| 16.60 | .00164 | 57.16 | 85.7 | 66.7 |
| 16.74 | .0016 | 57.66 | 83.6 | 69.0 |
| 16.74 | .0018 | 57.66 | 94.1 | 61.3 |
| 18.15 | .0391 | 62.50 | 1393.0 | 4.5 |
| 18.46 | .00261 | 63.58 | 136.3 | 46.7 |
| 23.20 | .0551 | 79.89 | 1963 | 4.1 |
| 29.54 | .0806 | 101.75 | 2872 | 3.5 |
| 32.46 | .0909 | 111.81 | 3239 | 3.4 |
| 42.0 | .140 | 144.67 | 4989 | 2.9 |
| 59.0 | .201 | 203.23 | 7163 | 2.8 |
| 80.0 | .310 | 275.55 | 11048 | 2.5 |
| 97.0 | .373 | 334.11 | 13292 | 2.5 |

TABLE IX

FLUID 19
TUBE VISCOMETER - L = 213/36 cm, D = 0.066 cm

| $\Delta P$ psi | Q cc/sec | $T_w$ dynes/cm$^2$ | $\Delta v/\Delta r$ sec$^{-1}$ | $\mu^a$ cp |
|---|---|---|---|---|
| 11.7 | .00354 | 62.4 | 126.8 | 49 |
| 17.0 | .0052 | 90.7 | 186.2 | 49 |
| 38.8 | .01245 | 207.0 | 446.0 | 46 |
| 65.0 | .0214 | 346.7 | 766.5 | 45 |
| 98.5 | .0333 | 525.5 | 1192.7 | 44 |

Samples 17 and 18, for example, are quite unique. Sample 17 has a structural rearrangement within the fluid up to a shear rate of 300 sec$^{-1}$ at which time the fluid collapses and offers essentially no resistance to flow until the shear rate reaches 2,600 sec$^{-1}$ at which time the fluid reverts to a non-Newtonian flow characteristic. Sample 18 behaves the same way, except the collapse occurs at a shear rate of 135 sec$^{-1}$ and does not recover until 1400 sec$^{-1}$. This behavior is observed with both fluids, whether the fluid is exposed to an increasing or decreasing sequence of shear rates, with no hysteresis.

Samples 12, 13, and 19 are not compositions of this invention because they do not exhibit retro-viscous properties.

EXAMPLE 5

To show that the surfactant of the invention is critical, the following example is presented:

A composition is obtained by mixing 32.8% distilled water, 31.5% dodecyl trimethyl ammonium bromide (the surfactant) and 35.7% chloroform. Pressure drop as $\Delta P$ (psi) vs. flow rate, Q (cc/sec) data are obtained as reported in Table X:

TABLE X

| TUBE VISCOMETER DATA | |
|---|---|
| $\Delta P$ (psi) | Q(cc/sec) |
| 20.0 | .04247 |
| 28.44 | .07938 |
| 40.0 | .1386 |
| 40.0 | .1474 |
| 49.8 | .2010 |
| 70.0 | .3670 |
| 70.0 | .3704 |
| 70.0 | .380 |
| 84.0 | .5481 |
| 100.0 | .700 |
| 100.0 | .7010 |
| 100.0 | .7580 |

These data are obtained in a tube viscometer having a diameter of 0.0483 inch and a length of 84 inches. As these data indicate, a substantially large increase in flow rate is not observed at small increases in $\Delta P$.

The above examples are not intended to limit the invention; rather, all equivalents obvious to those skilled in the art are intended to be incorporated within the scope of the invention as defined within the specification and appended claims.

What is claimed is:

1. In a process of drilling a well utilizing a circulating drilling fluid, the improvement comprising circulating a composition at flow rates predetermined to produce retroviscous behavior, the composition containing lamellar micelles, having an axial ratio of at least 3.5 and having a viscosity of at least 75 cp at a shear rate of $10^{-1}$ seconds at 23°C., and comprised of about 30 to about 70% of a liquid hydrocarbon, about 15 to about 66% of water, about 4 to about 15% of surfactant which is an alkaryl sulfonate having an average equivalent weight of about 350 to about 525, or a carboxylate having an average equivalent weight of about 200 to about 500, the percents based on weight, the composition being optically clear, phase stable, exhibiting birefringence and the composition exhibiting a substantial increase in flow rate at minor increase in pressure drop while the fluid is under flow conditions at a certain pressure.

2. The process of claim 1 wherein the surfactant is a petroleum sulfonate containing an alkali metal or ammonium cation.

3. The process of claim 1 wherein the composition contains up to about 20% by weight of a cosurfactant which is an alcohol, ether, aldehyde, ester, or ketone, and contains 1 to about 20 carbon atoms.

4. The process of claim 1 wherein the composition contains 0.001 to about 5% by weight of an electrolyte which is an inorganic salt, inorganic base, inorganic acid, or a combination thereof.

5. The process of claim 1 wherein the surfactant is present in concentrations of about 5.5% to about 12%, the hydrocarbon is present in concentrations of about 40 to about 60% and the water is present in concentrations of about 20 to about 55%.

6. The process of claim 1 wherein the axial ratio of the micelle is at least about 10.

7. In a process of drilling a well utilizing a circulating drilling fluid, the improvement comprising circulating in said well as a drilling fluid and at flow rates predetermined to produce retro-viscous behavior, a composition containing lamellar micelles which have an axial ratio of at least about 3.5 and which have a viscosity of at least 75 cp at a shear rate of $10^{-1}$ seconds at 23°C., and which exhibit retro-viscous properties at the predetermined flow rates, the composition comprised of about 4 to about 15% of an alkaryl sulfonate having an average equivalent weight within the range of about 350 to about 525, about 30% to about 70% of a liquid hydrocarbon, about 15 to about 66% of water, and about 0.01 to about 20% of a cosurfactant containing 1 to about 20 carbon atoms, the percents based on weight, the composition being optically clear, phase stable and exhibiting birefringence.

8. The process of claim 7 wherein the composition contains about 0.001 to about 5%, by weight, of an inorganic salt, inorganic acid, inorganic base or combination thereof.

9. The process of claim 7 wherein the sulfonate is a petroleum sulfonate having an average equivalent weight within the range of about 375 to about 500.

10. The process of claim 7 wherein the hydrocarbon concentration is about 45 to about 55%.

11. The process of claim 7 wherein the hydrocarbon is a crude oil, partially refined fraction of a crude oil, or a refined fraction of a crude oil.

12. The process of claim 7 wherein the water concentration is about 25 to about 50%.

13. The process of claim 7 wherein the axial ratio of the micelle is at least about 10.

* * * * *

UNITED STATES PATENT AND TRADEMARK OFFICE
CERTIFICATE OF CORRECTION

PATENT NO. : 3,948,782
DATED : April 6, 1976
INVENTOR(S) : Karl D. Dreher et al.

It is certified that error appears in the above-identified patent and that said Letters Patent are hereby corrected as shown below:

Column 3, line 43, delete "hydrogen" and insert therefor

-- hydrocarbon --.

Signed and Sealed this

*Twenty-sixth* Day of *June 1979*

[SEAL]

*Attest:*

RUTH C. MASON
*Attesting Officer*

DONALD W. BANNER
*Commissioner of Patents and Trademarks*